(12) United States Patent
Dulam (10) Patent No.: US 10,795,917 B2
(45) Date of Patent: Oct. 6, 2020

(54) AUTOMATIC GENERATION OF REGULAR EXPRESSIONS FOR HOMOGENOUS CLUSTERS OF DOCUMENTS

(71) Applicant: salesforce.com, inc., San Francisco, CA (US)

(72) Inventor: Ganeswara Rao Dulam, Vancouver (CA)

(73) Assignee: salesforce.com, inc., San Francisco, CA (US)

( * ) Notice: Subject to any disclaimer, the term of this patent is extended or adjusted under 35 U.S.C. 154(b) by 61 days.

(21) Appl. No.: 16/025,929

(22) Filed: Jul. 2, 2018

(65) Prior Publication Data
US 2020/0004869 A1 Jan. 2, 2020

(51) Int. Cl.
G06F 16/00 (2019.01)
G06F 16/28 (2019.01)
G06F 16/93 (2019.01)

(52) U.S. Cl.
CPC .......... *G06F 16/285* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 7,730,478 B2 | 6/2010 | Weissman | |
| 8,620,842 B1 * | 12/2013 | Cormack | G06N 20/00 706/12 |
| 8,832,108 B1 | 9/2014 | Sampson | |
| 9,477,756 B1 * | 10/2016 | Park | G06F 16/951 |
| 9,792,289 B2 * | 10/2017 | Reininger | G06F 16/156 |
| 2002/0078091 A1 | 6/2002 | Vu et al. | |
| 2002/0099730 A1 | 7/2002 | Brown et al. | |
| 2011/0258229 A1 | 10/2011 | Ni et al. | |
| 2014/0214835 A1 | 7/2014 | Oehrle et al. | |
| 2018/0307904 A1 * | 10/2018 | Patil | G06K 9/628 |
| 2019/0278788 A1 | 9/2019 | Starr et al. | |
| 2020/0004869 A1 | 1/2020 | Dulam | |
| 2020/0004870 A1 | 1/2020 | Dulam | |

OTHER PUBLICATIONS

Alberto Bartoli et al., "Inference of Regular Expressions for Text Extraction from Examples," 2016, 14 pages.
Andrew Rosenberg et al., "V-Measure: A conditional entropy-based external cluster evaluation measure," 2007, pp. 410-420, Proceedings of the 2007 Joint Conference on Empirical Methods in Natural Language Processing and Computational Natural Language Learning, Prague, Jun. 2007, Association for Computational Linguistics.
Non-Final Office Action for U.S. Appl. No. 16/025,936, dated Apr. 14, 2020, 13 pages.
Final Office Action for U.S. Appl. No. 16/025,936, dated Jun. 24, 2020, 10 pages.

* cited by examiner

*Primary Examiner* — Debbie M Le
(74) *Attorney, Agent, or Firm* — Nicholson De Vos Webster & Elliott, LLP (57) ABSTRACT

Regular expressions are generated automatically by receiving documents, clustering the documents, and selecting tokens from the documents which occur in each document in the cluster, and generating a regular expression for each cluster of documents using the selected tokens.

20 Claims, 10 Drawing Sheets

AUTOMATIC GENERATION OF REGULAR EXPRESSIONS FOR HOMOGENOUS CLUSTERS OF DOCUMENTS

TECHNICAL FIELD

One or more implementations relate to the field of document classification; and more specifically, to the automated clustering and classification of documents.

BACKGROUND ART

One prior art technique of regular expression generation is to manually refine regular expressions through iterative modification and feedback from percentage of documents matched. A prior technique of homogenous cluster generation is manual inspection of documents in a cluster to determine whether they increase or decrease homogeneity of the cluster.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for automatically generating regular expressions using homogenous clusters of documents, classifying new documents into existing clusters, and triggering the creation of new clusters. More specifically, the following description describes at least two techniques that may be used independently or in combination: 1) a technique to generate regular expressions from homogenous clusters regardless of how those homogenous clusters are generated; and 2) a technique to generate homogenous clusters for regular expression generation regardless of how the regular expression generation is performed.

Figure 1:
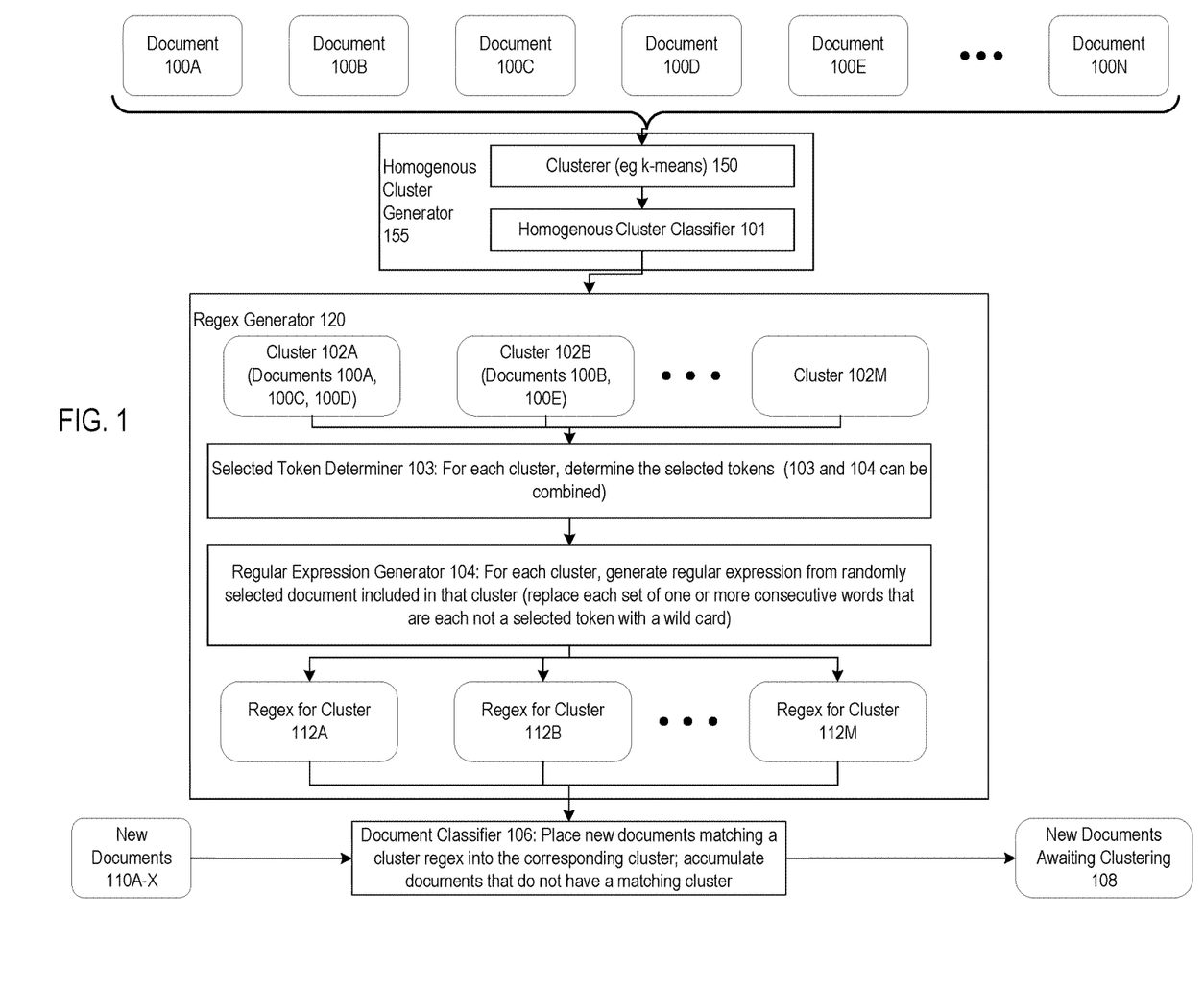
FIG. 1 is a block diagram illustrating automated regular expression generation using homogenous clusters according to some example implementations.

FIG. 1 is a block diagram illustrating a technique to generate regular expressions as part of automated regular expression generation using homogenous clusters according to some example implementations. In homogenous cluster generator 155, homogenous cluster classifier 101 classifies clusters from clusterer 150 into homogenous clusters 102A-100M and non-homogenous clusters (not illustrated) for documents 100A-100N. In some implementations, homogenous clusters are sets of documents that share certain characteristics (e.g., words, underlying concepts, metadata) more closely with each other than with documents belonging to other clusters. Each of the documents may only occur in (be part of) one cluster. For each cluster, selected token determiner 103 generates selected tokens from documents in the cluster. In one implementation, the selected tokens include an ordered set of tokens that are common across all documents in the cluster. Other implementations may, for example, use an unordered set of tokens and/or select tokens that are common across a threshold percentage of documents in the cluster (i.e., present in ninety percent of documents in the cluster) instead of all documents in the cluster. Regular expression generator 104 generates, for each cluster, a regular expression from the selected tokens for that cluster (in FIG. 1, each of the regular expressions 112A-112M is generated from the selected tokens for a respective one of the clusters). While in one implementation the regular expression is generated by inserting a wildcard character between, before, and after each of the selected tokens, alternative implementations may use other techniques, such as multi-word tokens. Regular expression generator 104 outputs regular expressions 112A through 112M to classifier 106. While in one implementation the method selects the document randomly from the current cluster, alternative implementation may use other techniques (e.g., selecting the first document, selecting the last document, selecting the smallest document, selecting the shortest document). Document classifier 106 uses regular expressions 112A-112M to classify new documents 110A-110X into existing clusters 102A-102M. In one implementation, classifier 106 adds a new document to a cluster when the new document matches the regular expression corresponding to that cluster. In one implementation, classifier 106 accumulates new documents awaiting clustering 108 until a threshold number of documents is met and then additional clusters are generated (e.g., by clusterer 150) and regular expressions corresponding to the accumulated documents. In one example, testing an updated version of software across many client instances that include many client-specific test cases can result in millions of error messages. Grouping these error messages according to their origin (a common underlying software bug in the updated software) is very resource intensive. Accordingly, in one implementation, clustering the error messages into homogenous clusters of similar error messages and automatically generating regular expressions to match subsequent documents for inclusion in the matching cluster reduces the amount of time spent grouping the error messages, which advantageously allows engineers to fix the bugs sooner, which in turn allows the updated software to be fixed and delivered to the clients sooner.

Figure 2:
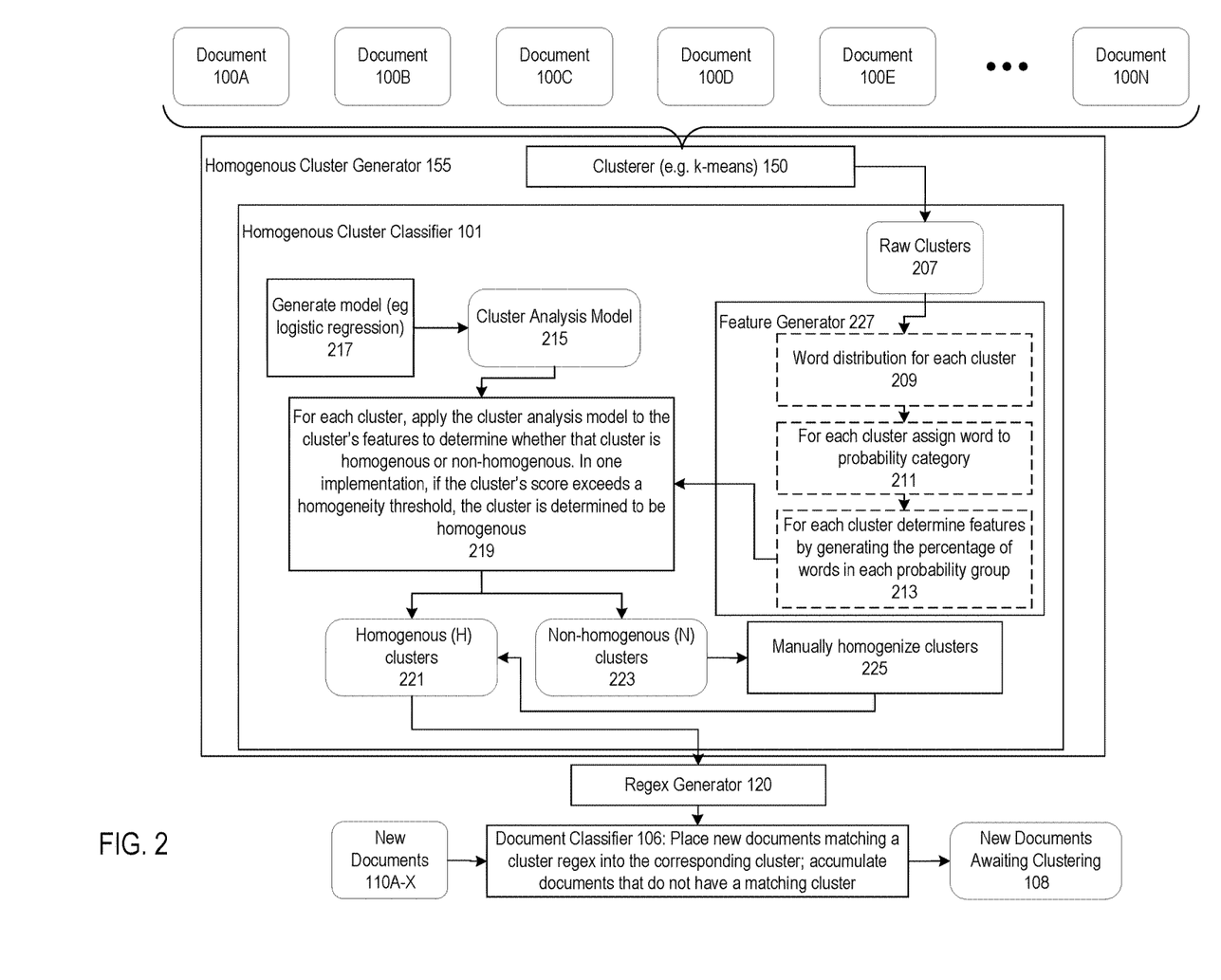
FIG. 2 is a block diagram illustrating homogenous cluster generation according to some example implementations.

FIG. 2 is a block diagram illustrating a technique to generate homogenous clusters as part of automated regular expression generation using homogenous clusters according to some example implementations. In one implementation, a homogenous cluster includes documents related to the same underlying concept. For example, if documents being clustered contain error messages describing various software bugs, a homogenous cluster would include documents related to one software bug and a non-homogenous cluster would include documents related to more than one software bug. In another implementation, a homogenous cluster includes a threshold (e.g., 80%) proportion of documents related to one software bug, and a non-homogenous cluster includes less than the threshold proportion of documents related to the same software bug. The threshold may be tuned to balance cluster generation performance and cluster homogeneity. In homogenous cluster generator 155, homogenous cluster classifier 101 receives raw clusters 207 from clusterer 150. Clusterer 150 generates clusters 207 from documents 100A-100N. While in one implementation cluster generator 150 uses k-means clustering, alternative implementations may use a different form of clustering (e.g., mean-shift clustering, density-based spatial clustering of applications with noise, expectation-management clustering using gaussian mixture modules, or other clustering algorithms known in the art). Raw clusters 207 are output by clusterer 150 to feature generator 227, which applies one or more operations to documents of each cluster in clusters 207 and, if available, metadata of the cluster to create one or more features which are that are descriptive of the cluster. The number of features and the nature of the features are predetermined based on an investigation of their predictive weight with the type of model chosen for the cluster analysis model 215. In one implementation the feature generator 227 includes word distribution generator 209, probability category assigner 211, and probability group assigner 213. Word distribution generator 209 generates a percentage value for each word in each document in each cluster. The percentage value indicates what percentage of documents in the cluster the word occurs at least once. Probability category assigner 211 assigns each word to a category corresponding a percentage range. While in one implementation, ten categories, each covering a range of ten percentage points, is used, alternative implementations could use other techniques (e.g., wider or narrower probability groups). Probability group assigner 213 generates a feature by normalizing, for each cluster, the values in each probability range such that adding the normalized values for each probability range for the cluster equals one. At block 219, homogenous cluster classifier 101 applies the cluster analysis model to features of each cluster from feature generator 227 to determine if the cluster is homogenous. In one implementation, if the cluster's score exceeds a homogeneity threshold, the cluster is determined to be homogenous, otherwise the cluster is determined to be non-homogenous. In some implementations, clusters are annotated with a metadata flag that indicates whether the cluster is determined to be homogenous or non-homogenous.

Figure 3:
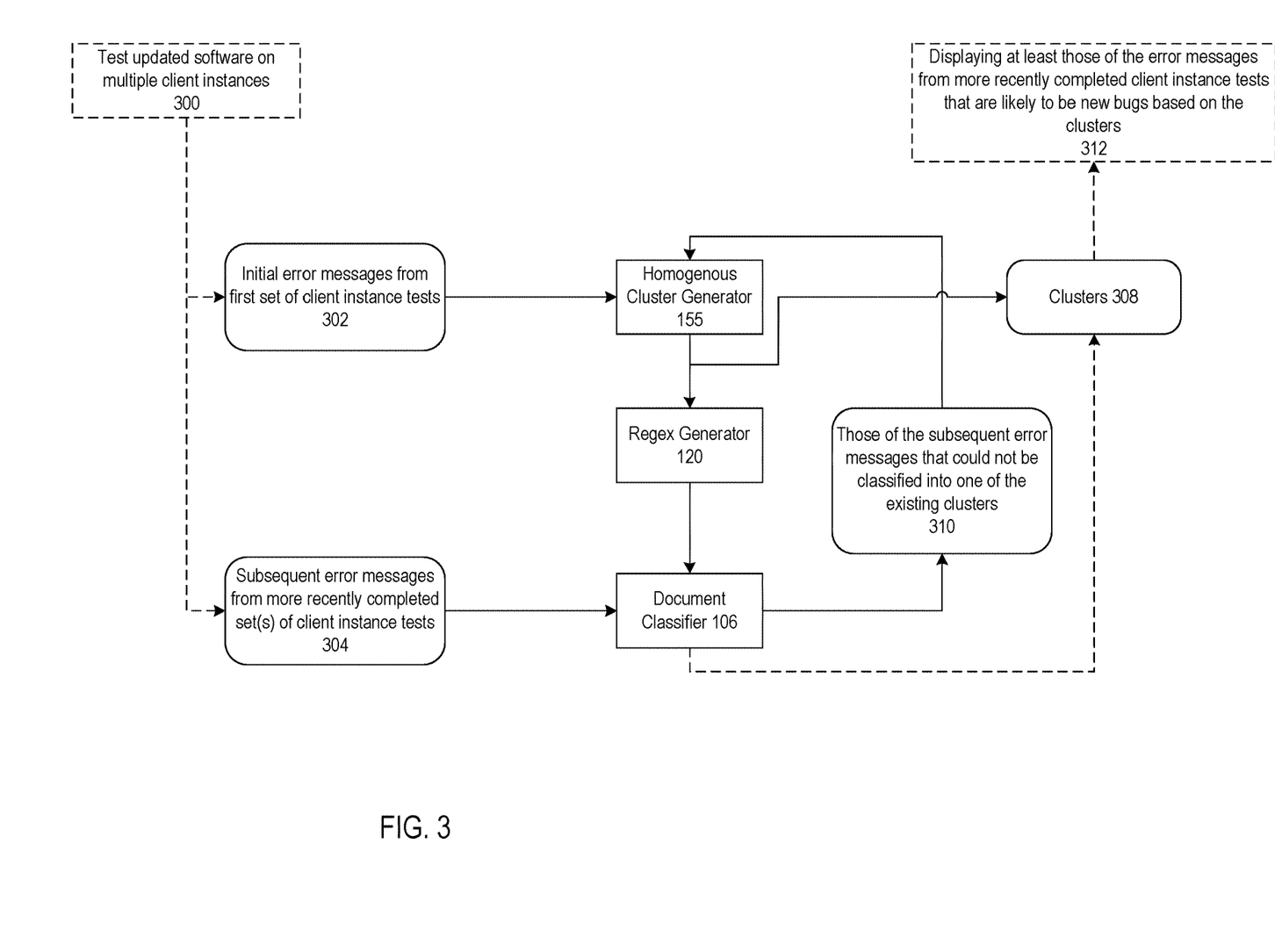
FIG. 3 is a flow diagram illustrating a method of generating regular expressions and categorizing for different sets of error messages according to some example implementations.

Homogenous cluster classifier 101 outputs homogenous clusters 221 to regex generator 120, which generates regular expressions for each homogenous cluster 221. Classifier 106 uses the regular expressions to classify new documents 110A-110X into existing clusters 221 and accumulates new documents 108 which do not match an existing regular expression. Non-homogenous clusters are queued for manual homogeneous cluster generation. Cluster analysis model 215 is generated (block 217) asynchronously from determining whether new clusters are homogenous or not. While in one implementation cluster analysis model 215 is a logistic regression model generated using manually annotated training data, alternative implementations may use a different model (e.g., Bayesian linear regression or other models known in the art may be used). Also at block 219, homogenous cluster classifier 101 sends non-homogenous clusters 223 to block 225 for manual homogenization of the non-homogenous clusters, which may be sent to regex generator 120 after being manually homogenized. The advantageous use of generating regular expressions from homogenous clusters described above in reference to FIG. 1 applies when using this technique to generate homogenous clusters FIG. 3 is a flow diagram illustrating a method of generating regular expressions and categorizing for different sets of error messages according to some example implementations. In one implementation, an updated version of a piece of software is tested externally on multiple client instances. A client instance may be software instance 1002 in electronic device 1000. For example, the updated software may be run on several client instances and tested using predefined test cases. Unsuccessful test execution generates error messages, which are stored for subsequent analysis and may number into the millions of error messages. Each error message probably corresponds to a bug in the updated software, which needs to be identified and communicated to the development team to be fixed. It is not unusual for the same software bug to cause more than one pre-defined test case to fail and generate an error message although different test cases generate different error messages. A homogenous cluster of error messages will include different error messages that correspond to the same underlying software bug, greatly increasing the efficiency of analyzing the error messages for communication to the development team.

At block 300, updated software is tested on multiple client instances resulting in the generation of initial error messages 302 (which in this example are the documents 100A-N) that are input to homogenous cluster classifier 101 which generates homogenous clusters 308. Regular expression generator 120 generates regular expressions for each cluster in cluster 308. At block 312, error messages in each cluster are displayed for debugging purposes. The continued testing of updated software on multiple client instances results in the generation of subsequent error messages 304 that are provided to classifier 106 which may classify those that match regular expressions for existing clusters into the existing clusters 308 (i.e., error messages that match one of the existing clusters) while accumulating non-matching error messages for subsequent generation of additional clusters (see subsequent error messages that could not be classified into one of the existing clusters 310 are sent to homogenous cluster classifier 101). In terms of the example above, subsequent error messages that could not be classified into one of the existing clusters 310 originate from new software bugs not identified during the initial client instance tests. At block 312, error messages in each cluster are displayed for debugging purposes. In one implementation, the error messages in clusters 308 are displayed grouped by cluster, which is advantageous because it allows debuggers (programmers that work to fix bugs in software) to reduce the amount of time spent determining which error messages correspond to which underlying software bug, which in turn increases the amount of time available to the debuggers to focus on fixing the underlying software bugs, in addition to prioritizing the order in which underlying software bugs are resolved. Prioritization may be based on, for example, the number of error messages in a cluster or the number of error messages from unique clients per cluster. In one implementation, when homogeneous cluster classifier 101 generates a new cluster from subsequent error messages 310 and adds the new cluster to clusters 308, a notification is generated to consumers of error messages at block 312 indicating that the new cluster has been added. This is advantageous for the quality of the software being tested because it allows debuggers to become aware of new underlying bugs more quickly in the debugging cycle. Alternatively or additionally, when classifier 106 identifies error messages in subsequent error messages 304 that match the regular expression for an existing cluster in clusters 308, classifier 106 adds those matching error messages to the existing cluster and may generate a notification that the matching error messages have been added. This is advantageous for the quality of the software being tested because it allows debuggers to become aware of additional information describing existing bugs more easily in the debugging cycle.

Figure 4:
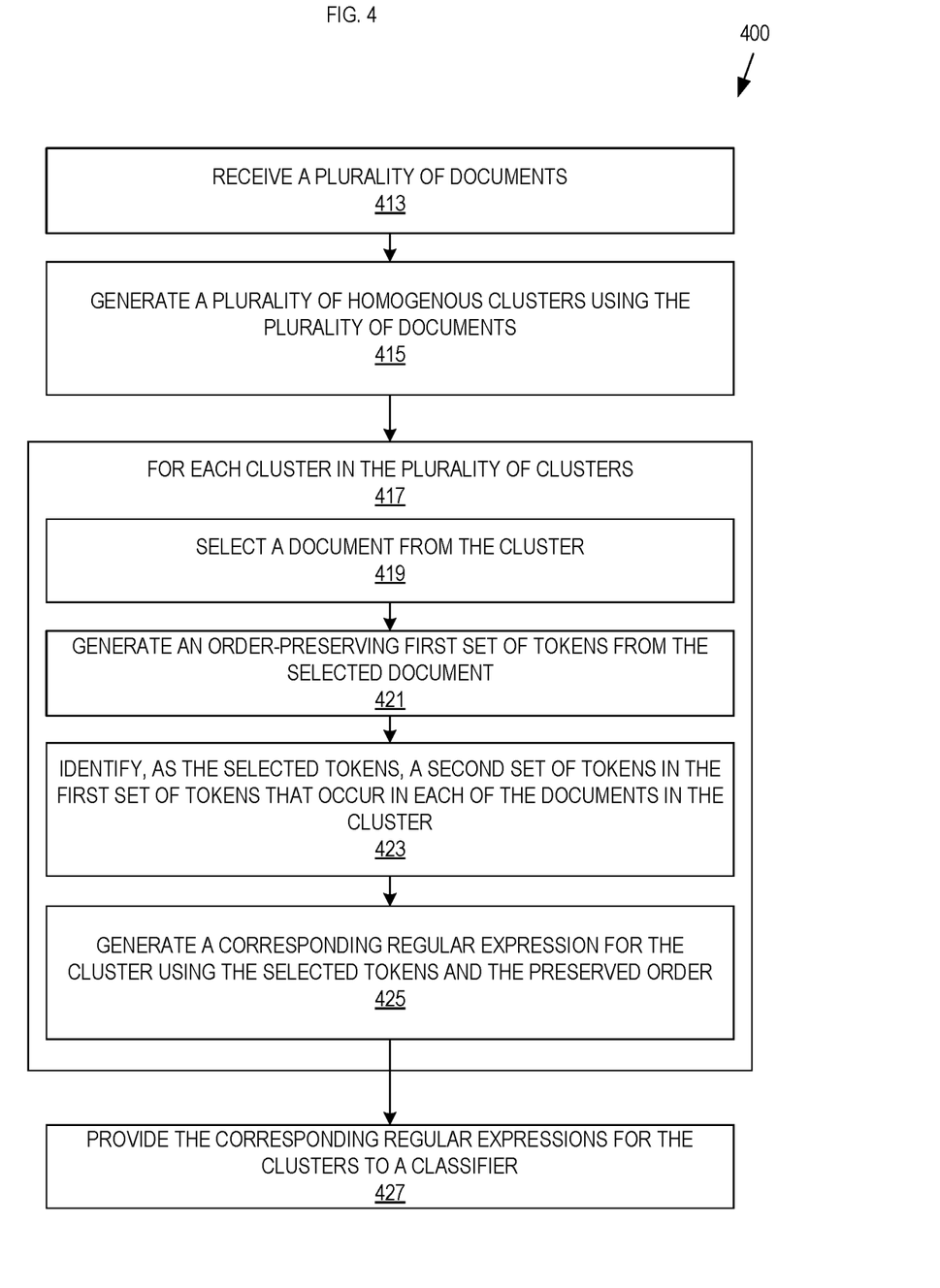
FIG. 4 is a more detailed flow diagram illustrating a method of generating regular expressions from clustered documents according to some example implementations.

FIG. 4 is a more detailed flow diagram illustrating a method of generating regular expressions from clustered documents according to some example implementations. In one implementation, instructions corresponding to the method reside in software 1028 on media 1026 and executed on processor 1022 of electronic device 1000.

At block 413, the method receives a plurality of documents. In one implementation, the documents comprise error messages resulting from failed test cases executing client instances on updated software.

Figure 7:
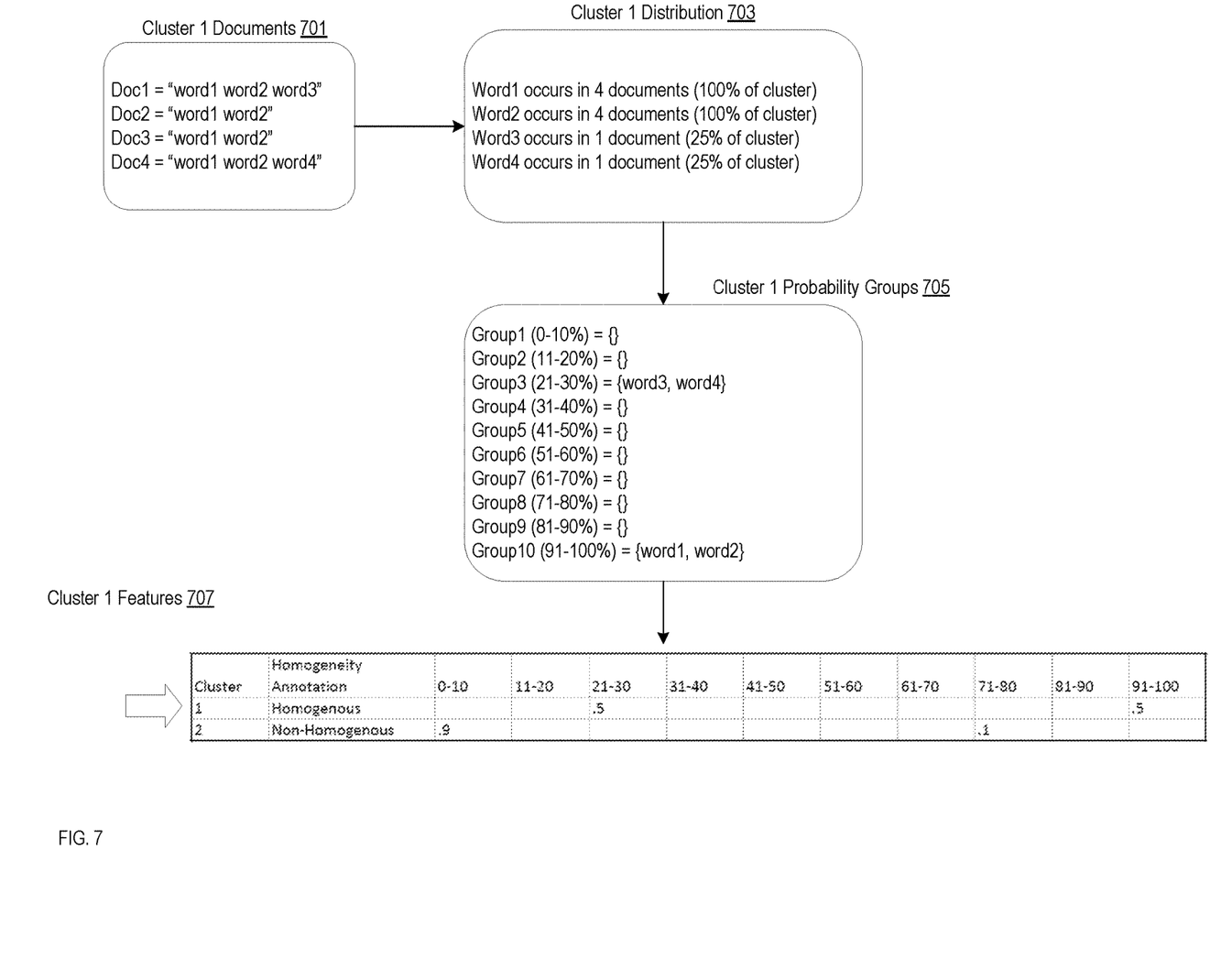
FIG. 7 is a block diagram illustrating cluster feature generation according to some example implementations.

At block 415, the method clusters the plurality of documents into a plurality of homogeneous clusters. While in one implementation the technique in FIG. 2 is used, alternative implementations may use other techniques. At block 417, for each cluster in the plurality of clusters, the method selects a document from the current cluster at block 419. The various implementations and alternatives described with reference to FIG. 1 may be applied here. At block 421, the method generates an order-preserving first set of tokens from the selected documents. An order-preserving set does not change the order of occurrence of tokens in a document. For example, FIG. 7 illustrates cluster documents 701 which includes doc3 comprised of "word1" followed by "word2." In an order-preserving set derived from doc3, "word1" occurs before "word2." At block 423, the method identifies, as selected tokens, a second set of tokens from the first set of tokens that occur in each of the documents in the cluster. Tokenizing a string denotes splitting a string with respect to a delimiter. A delimiter may be one or more characters, for example, a comma or a space. In some implementations, a tokenizer splits a string into tokens where a specified delimiter is encountered. At block 425, the method generates a regular expression corresponding to the current cluster using the selected tokens and the order preserved during generation of the first set of tokens at block 421. The various implementations and alternatives described with reference to FIG. 1 may be applied here. At block 427, the method provides the regular expressions corresponding to the clusters to a classifier, such as classifier 106.

Figure 5:
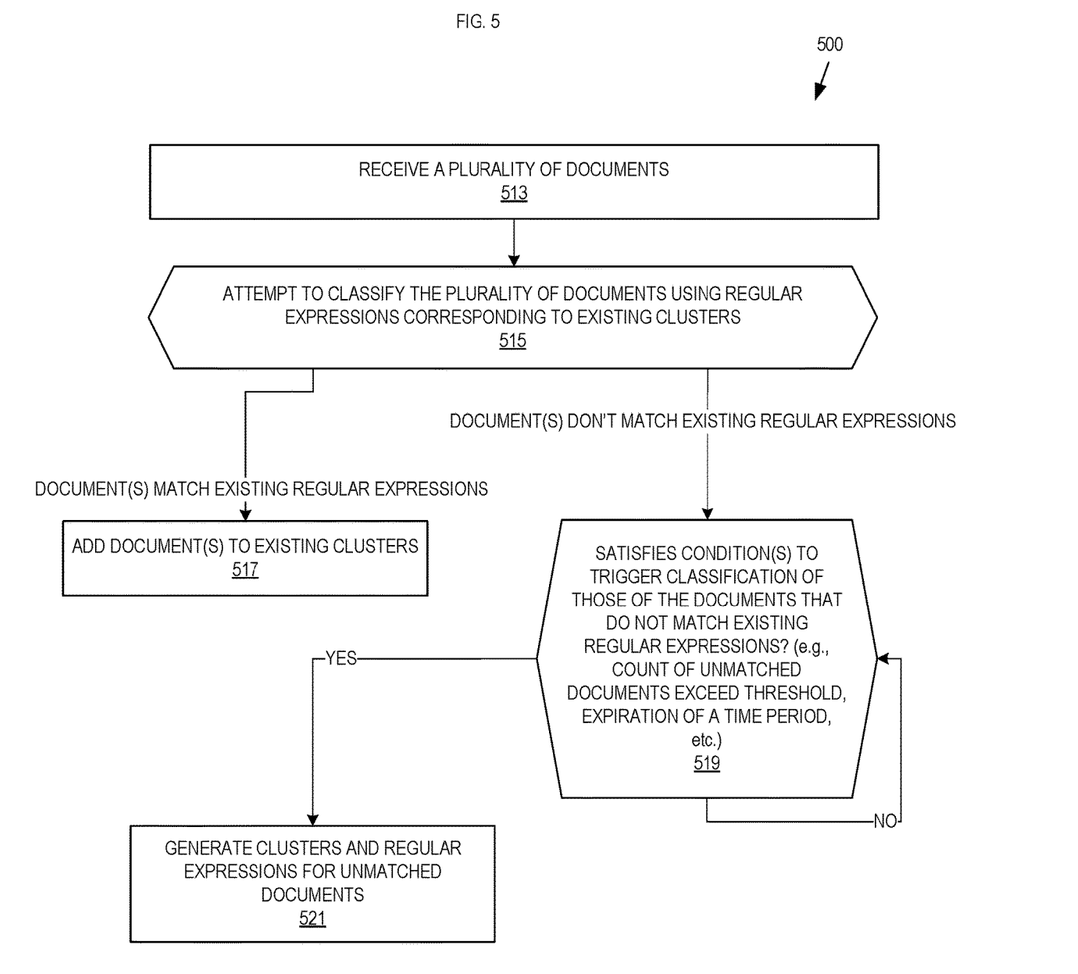
FIG. 5 is a flow diagram illustrating a method of classifying additional documents into existing clusters using regular expressions according to some example implementations.

FIG. 5 is a flow diagram illustrating a method of classifying additional documents into existing clusters using regular expressions according to some example implementations. In one implementation, instructions corresponding to the method reside in software 1028 on media 1026 and executed on processor 1022 of electronic device 1000.

At block 513, the method receives a plurality of documents. In one implementation, the plurality of documents comprise error messages generated by failed test cases that were collected after an initial plurality of documents was clustered (e.g., block 304). At block 515, the method attempts to classify the plurality of documents using regular expressions corresponding to existing clusters. At block 517, documents from the plurality of documents that match a regular expression corresponding to an existing cluster are added to the existing cluster. In one implementation, these matching documents contain error messages corresponding to software bugs previously encountered by the regular expression generator. At block 519, the method determines whether the plurality of unclassified documents satisfies a classification trigger. In one implementation, classification is triggered when the number of unclassified documents reaches a threshold, e.g., half a million documents. Additionally or alternatively, classification is triggered after a pre-defined amount of time has passed since the first unclassified document was encountered. If, at block 519, the method determines the threshold has not been reached, no action is taken. Otherwise, the method transitions to block 521 and generates clusters and regular expressions for the unmatched documents.

Figure 6:
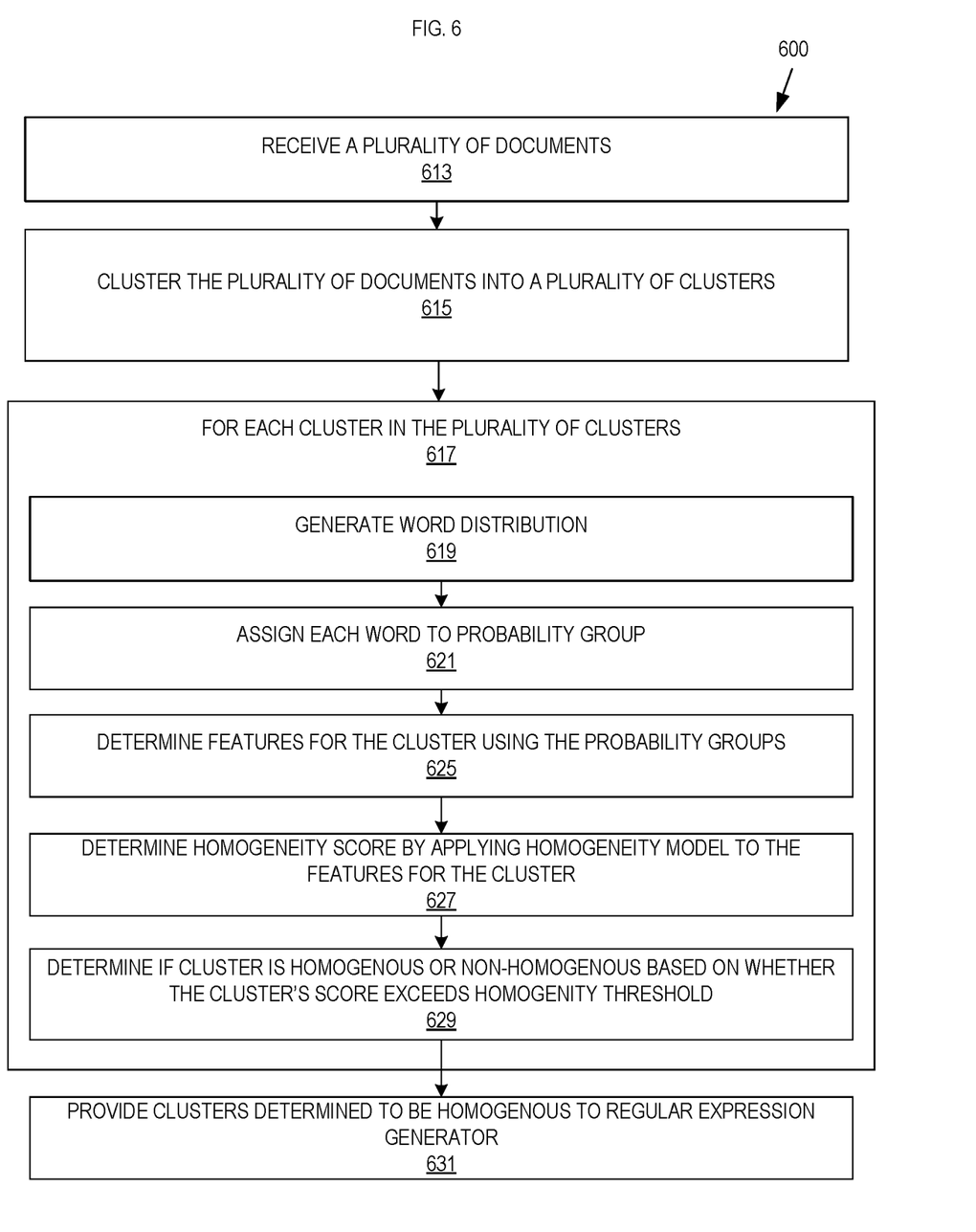
FIG. 6 is a flow diagram illustrating a method of generating homogenous clusters according to some example implementations.

FIG. 6 is a flow diagram illustrating a method of generating homogenous clusters according to some example implementations. In one implementation, instructions corresponding to the method reside in software 1028 on media 1026 and executed on processor 1022 of electronic device 1000.

At block 600, the method receives a plurality of documents. In one implementation, the plurality of documents comprises error messages. At block 615, the method clusters the plurality of documents into a plurality of clusters. The various implementations and alternatives described with reference to FIG. 2 may be applied here. At block 617, the method, for each cluster in the plurality of clusters, generates a word distribution at block 619. The word distribution is a percentage score assigned to each word in the current cluster corresponding to the proportion of documents in the cluster in which the word occurs. At block 621, the method assigns each word to a probability group. The various implementations and alternatives described with reference to FIG. 2 may be applied here. At block 625, the method determines features for the current cluster using the percentage of words in each probability group. The various implementations and alternatives described with reference to FIG. 2 may be applied here. At block 627, the method determines the homogeneity score by applying a homogeneity model to the features for the current cluster. The various implementations and alternatives described with reference to FIG. 2 may be applied here. At block 629, the method determines which clusters are considered homogenous based on the clusters' scores and a homogeneity threshold. The homogeneity threshold may be tuned up or down depending on the application. At block 631, the method provides the clusters determined to be homogeneous to the regular expression generator.

FIG. 7 is a block diagram illustrating cluster feature generation according to some example implementations, such as the method illustrated in FIG. 6. Cluster 701 includes documents clustered by a clustering algorithm at block 615. Method 600 generates cluster distribution 703 at block 619, indicating the percentage of documents in cluster 701 that each word occurring across cluster 701 appears. At block 621, the method 600 generates cluster probability groups 705, which allocates each word to a probability group. In the implementation illustrated in FIG. 7, ten groups are used, but others may be used in other implementations. At block 625 the method 600 generates a normalized percentage indicating the distribution of the cluster's words across the probability groups and stores these percentages as cluster features 707. In this example, the cluster includes four words, two of which (word3 and word4) occur in twenty-five percent of the documents in cluster one and appear in group3 (21-30%) while the other two words (word1 and word2) occur in all documents in the cluster and appear in group10 (91-100%). For illustrative purposes, the homogeneity annotations of cluster features 707 are populated in FIG. 7. In practice, new clusters would receive their homogeneity annotation based on the features of the new clusters.

Figure 8:
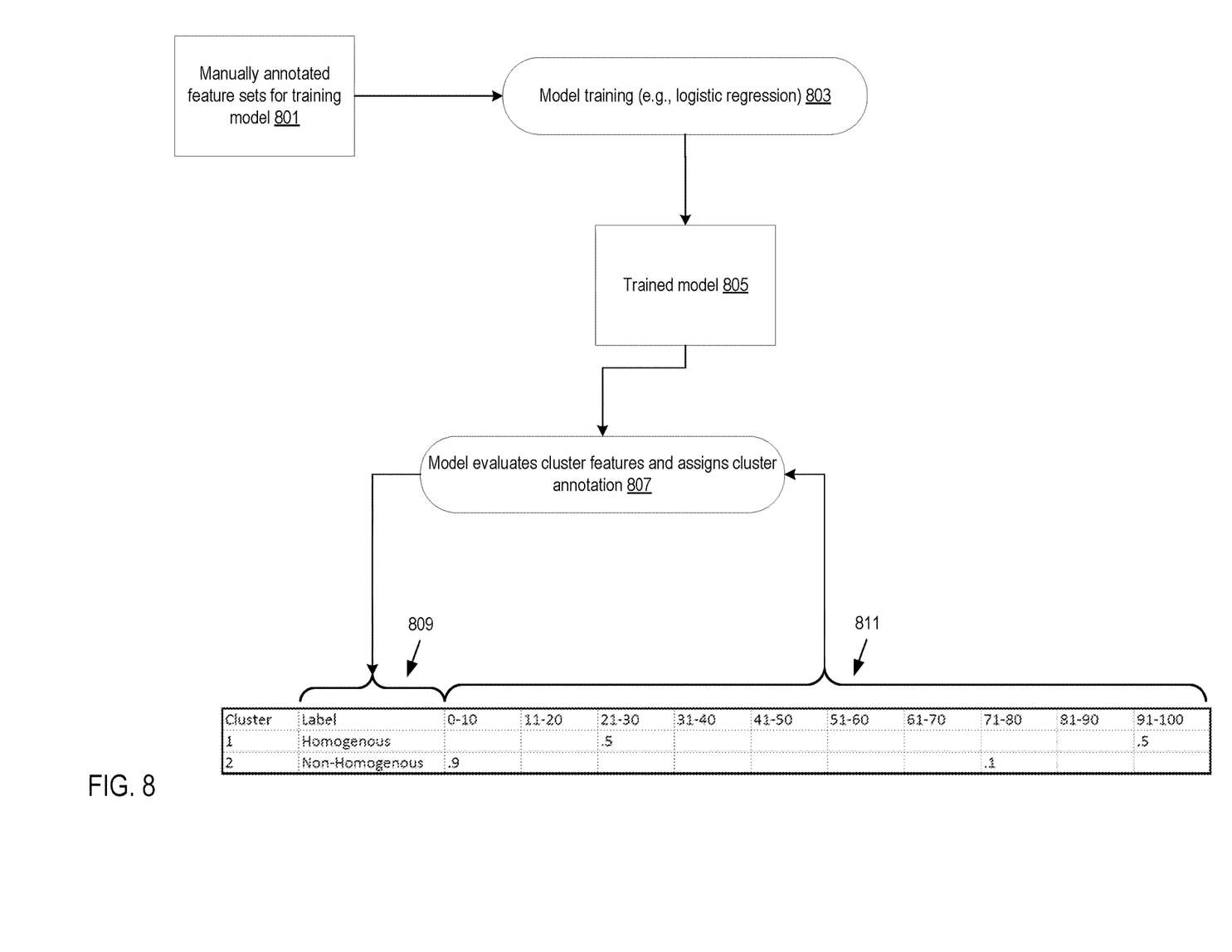
FIG. 8 is a block diagram illustrating training and applying a homogeneity model according to some example implementations.

FIG. 8 is a block diagram illustrating training and applying a homogeneity model according to some example implementations. At block 801, training data sets comprising features of clustered documents manually annotated to indicate whether the features correspond to a homogenous cluster or a non-homogenous cluster are generated asynchronously from using the model to automatically annotate new clusters. In some implementations, clusters of documents used to build the training data are different from the type of clusters to which the model be applied. For example, clusters of social media posts about related topics may be used to train a model that will be used to determine homogeneity of clusters of error messages.

At block 803, a trained model 805 is generated using the training data 801. Training techniques may vary according to application or the selected model type with the common purpose of training the model is annotate a cluster based on features of the cluster by exposing the model to cluster features that already include an annotation of homogeneity. At block 807, the model is applied to new cluster features 811 to generate cluster homogeneity annotations 809. The clusters annotated as homogenous may be sent to a regular expression generator, for example, by method 600 at block 631.

Figure 9:
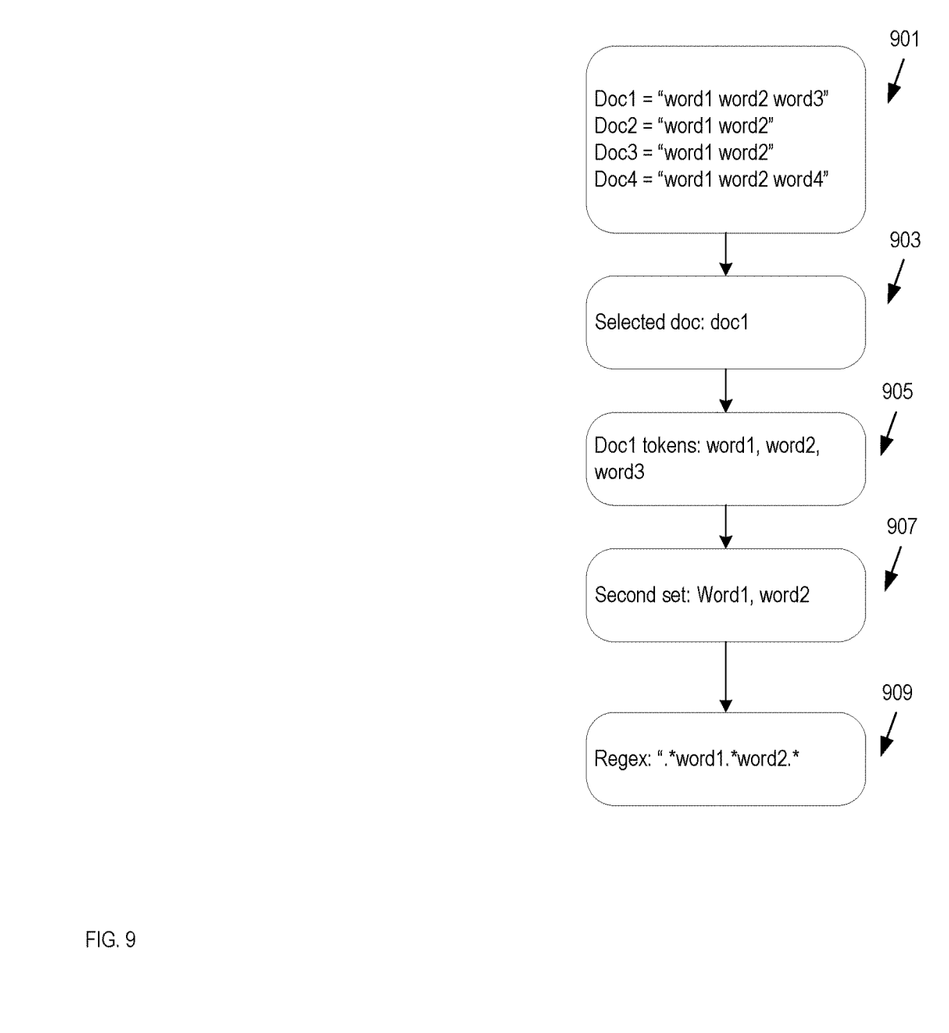
FIG. 9 is a block diagram illustrating generating regular expressions according to some example implementations.

FIG. 9 is a block diagram illustrating generating regular expressions according to some example implementations, such as the method 400 in FIG. 4. At block 901, a homogenous cluster of documents are received. At block 903, the first document, "doc1", is selected. The various implementations and alternatives described with reference to FIG. 1 may be applied here. At block 905, the first document is tokenized into a first plurality of tokens while preserving their order of appearance. At block 907, a second set of tokens is generated by deleting tokens that did not occur in each document across the cluster. At block 909, a regular expression is generated by inserting wild card characters at the beginning, between each, and at the end of the second plurality of tokens. The various implementations and alternatives described with reference to FIG. 1 may be applied here.

Exemplary Electronic Devices
Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 10A:
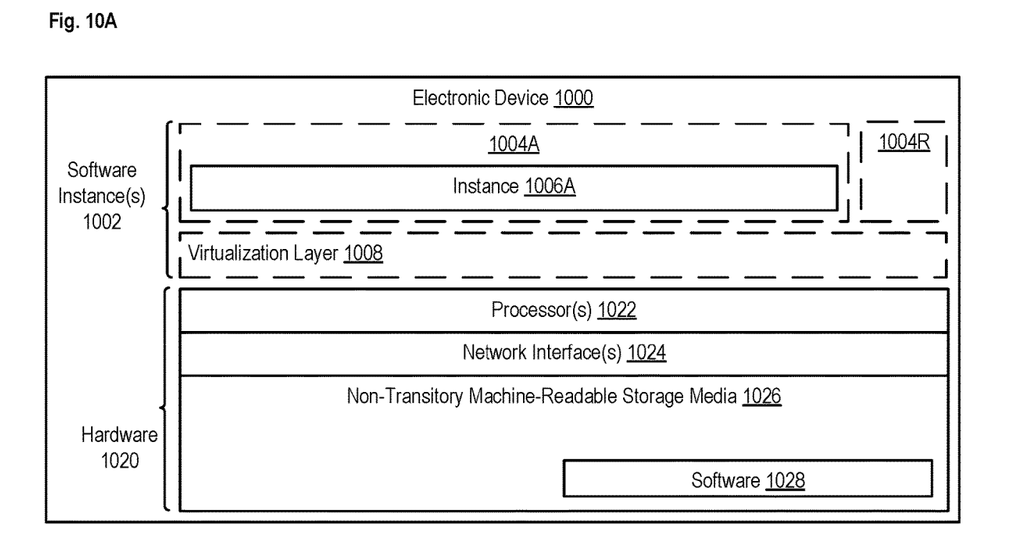
FIG. 10A is a block diagram illustrating an electronic device according to some example implementations.

FIG. 10A is a block diagram illustrating an electronic device 1000 according to some example implementations. FIG. 10A includes hardware 1020 comprising a set of one or more processor(s) 1022, a set of one or more network interfaces 1024 (wireless and/or wired), and non-transitory machine-readable storage media 1026 having stored therein software 1028 (which includes instructions executable by the set of one or more processor(s) 1022). Each of the previously described end user clients and the homogeneous and regex generator service may be implemented in one or more electronic devices 1000. In one implementation, one or more instances of updated software 300 being tested in FIG. 3 may be executed by electronic device 1000 as one or more software instances 1002. In this implementation, an output of the execution of software instances 1002 is initial error messages 302 and subsequent error messages 304.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 10B:
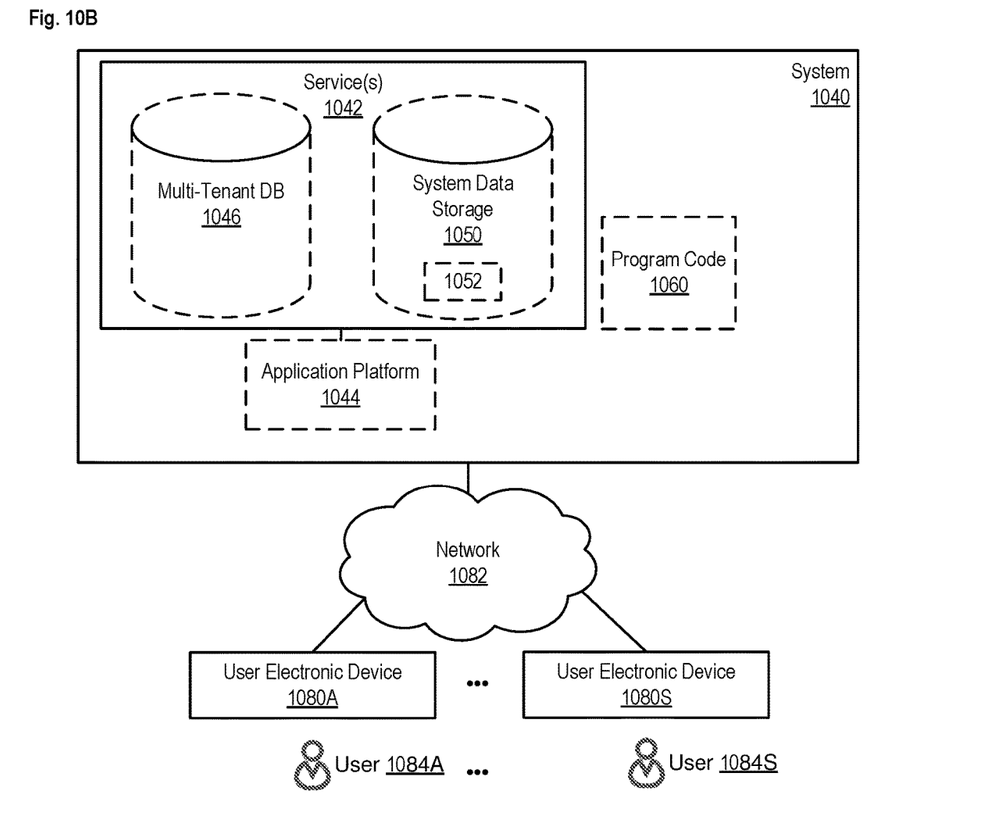
FIG. 10B is a block diagram of an environment where an updated software instance may be deployed, according to some implementations.

FIG. 10B is a block diagram of an environment where an updated software instance may be deployed, according to some implementations. A system 1040 includes hardware (a set of one or more electronic devices) and software to provide service(s) 1042, including the homogeneous and regex generator service. The system 1040 is coupled to user electronic devices 1080A-S over a network 1082. The service(s) 1042 may be on-demand services that are made available to one or more of the users 1084A-S working for one or more other organizations (sometimes referred to as outside users) so that those organizations do not need to necessarily be concerned with building and/or maintaining a system, but instead makes use of the service(s) 1042 when needed (e.g., on the demand of the users 1084A-S). The service(s) 1042 may communicate with each other and/or with one or more of the user electronic devices 1080A-S via one or more Application Programming Interface(s) (APIs) (e.g., a Representational State Transfer (REST) API). The user electronic devices 1080A-S are operated by users 1084A-S.

In one implementation, the system 1040 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1040 may include an application platform 1044 that enables PAAS for creating, managing, and executing one or more applications developed by the provider of the application platform 1044, users accessing the system 1040 via one or more of user electronic devices 1080A-S, or third-party application developers accessing the system 1040 via one or more of user electronic devices 1080A-S.

In some implementations, one or more of the service(s) 1042 may utilize one or more multi-tenant databases 1046 for tenant data 1048, as well as system data storage 1050 for system data 1052 accessible to system 1040. In certain implementations, the system 1040 includes a set of one or more servers that are running on server electronic devices and that are configured to handle requests for any authorized user associated with any tenant (there is no server affinity for a user and/or tenant to a specific server). The user electronic device 1080A-S communicate with the server(s) of system 1040 to request and update tenant-level data and system-level data hosted by system 1040, and in response the system 1040 (e.g., one or more servers in system 1040) automatically may generate one or more Structured Query Language (SQL) statements (e.g., one or more SQL queries) that are designed to access the desired information from the one or more multi-tenant database 1046 and/or system data storage 1050.

In some implementations, the service(s) 1042 are implemented using virtual applications dynamically created at run time responsive to queries from the user electronic devices 1080A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1060 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1044 includes an application setup mechanism that supports application developers' creation and management of applications, which may be saved as metadata by save routines. Invocations to such applications, including the homogeneous and regex generator service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1082 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1040 and the user electronic devices 1080A-S.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A computer implemented method for automatically generating regular expressions, the method comprising:
    receiving a first plurality of documents;
    generating a first plurality of homogenous clusters using the first plurality of documents, wherein each of the first plurality of documents is included in only one of the clusters, wherein each of the clusters includes one or more of the documents and wherein the documents in each cluster share certain characteristics more closely with each other than the documents of the other clusters in the first plurality of clusters;
    for each cluster in the first plurality of clusters:
        selecting a single document from the cluster;
        generating a first set of tokens from only the single document selected from the cluster, wherein an order of the tokens in the single document selected from the cluster is preserved in an order of the tokens in the first set of tokens;
        identifying a second set of tokens in the first set of tokens that occur in each of the other documents in the cluster in the preserved order;
        generating a regular expression for the cluster using the second set of tokens and the preserved order; and
    providing the regular expressions for each of the first plurality of clusters to a document classifier.

2. The method of claim 1, further comprising:
    attempting to classify a second plurality of documents into the first plurality of clusters using the regular expressions; and
    adding each those of the second plurality of documents that were successfully classified into one of the first plurality of clusters to that cluster.

3. The method of claim 2, further comprising:
    clustering those of the second plurality of documents that were not successfully classified into one of the first plurality of clusters into a second plurality of clusters;
    generating a regular expression for each of the second plurality of clusters; and
    providing the regular expression for each of the second plurality of clusters to the document classifier.

4. The method of claim 3, wherein for each cluster in the first plurality of clusters and the second plurality of clusters, the generating the regular expression for the cluster comprises generating only one for the cluster, and wherein the providing the regular expression for each of the first plurality of clusters and the second plurality of clusters is limited to one per cluster.

5. The method of claim 3, wherein the first plurality of documents includes error messages from a first test and the second plurality of documents include error messages from a second test, further comprising:
    generating a new bug notification for each cluster in the second plurality of clusters.

6. The method of claim 5, further comprising:
    determining that a quantity of remaining documents in the second plurality of documents exceeds a clustering threshold before the clustering.

7. The method of claim 3, wherein the first plurality of documents are error messages from a first test and the second plurality of documents are error messages from a second test, wherein, for each cluster in the first plurality of clusters and the second plurality of clusters, the generating the regular expression for the cluster comprises generating a single regular expression that includes two or more ordered alphanumeric strings and that every document in the cluster will match and wherein each cluster in the first plurality of clusters and the second plurality of clusters corresponds to one or more related software errors.

8. The method of claim 1, wherein the selecting a single document from the cluster includes randomly selecting the single document from the cluster.

9. The method of claim 1, wherein the generating a regular expression comprises inserting a wildcard before, between, and after each token in the second set of tokens.

10. A non-transitory machine-readable storage medium that provides instructions that, if executed by a processor, will cause said processor to perform operations comprising:
  receiving a first plurality of documents;
  generating a first plurality of homogenous clusters using the first plurality of documents, wherein each of the first plurality of documents is included in only one of the clusters, wherein each of the clusters includes one or more of the documents and wherein the documents in each cluster share certain characteristics more closely with each other than the documents of the other clusters in the first plurality of clusters;
  for each cluster in the first plurality of clusters:
    selecting a single document from the cluster;
    generating a first set of tokens from only the single document selected from the cluster, wherein an order of the tokens in the single document selected from the cluster is preserved in an order of the tokens in the first set of tokens;
    identifying a second set of tokens in the first set of tokens that occur in each of the other documents in the cluster in the preserved order;
    generating a regular expression for the cluster using the second set of tokens and the preserved order; and
  providing the regular expressions for each of the first plurality of clusters to a document classifier.

11. The non-transitory machine-readable storage medium of claim 10, the operations further comprising:
  attempting to classify a second plurality of documents into the first plurality of clusters using the regular expressions; and
  adding each those of the second plurality of documents that were successfully classified into one of the first plurality of clusters to that cluster.

12. The non-transitory machine-readable storage medium of claim 11, the operations further comprising:
  clustering those of the second plurality of documents that were not successfully classified into one of the first plurality of clusters into a second plurality of clusters;
  generating a regular expression for each of the second plurality of clusters; and
  providing the regular expression for each of the second plurality of clusters to the document classifier.

13. The non-transitory machine-readable storage medium of claim 12, wherein for each cluster in the first plurality of clusters and the second plurality of clusters, the generating the regular expression for the cluster comprises generating only one for the cluster, and wherein the providing the regular expression for each of the first plurality of clusters and the second plurality of clusters is limited to one per cluster.

14. The non-transitory machine-readable storage medium of claim 12, wherein the first plurality of documents includes error messages from a first test and the second plurality of documents include error messages from a second test, further comprising:
  generating a new bug notification for each cluster in the second plurality of clusters.

15. The non-transitory machine-readable storage medium of claim 14, the operations further comprising:
  determining that a quantity of remaining documents in the second plurality of documents exceeds a clustering threshold before the clustering.

16. The non-transitory machine-readable storage medium of claim 12, wherein the first plurality of documents are error messages from a first test and the second plurality of documents are error messages from a second test, wherein, for each cluster in the first plurality of clusters and the second plurality of clusters, the generating the regular expression for the cluster comprises generating a single regular expression that includes two or more ordered alphanumeric strings and that every document in the cluster will match and wherein each cluster in the first plurality of clusters and the second plurality of clusters corresponds to one or more related software errors.

17. The non-transitory machine-readable storage medium of claim 10, wherein the selecting a single document from the cluster includes randomly selecting the single document from the cluster.

18. The non-transitory machine-readable storage medium of claim 10, wherein the generating a regular expression comprises inserting a wildcard before, between, and after each token in the second set of tokens.

19. An article of manufacture comprising:
  a processor; and
  a memory coupled to the processor, the memory storing instructions which, when executed by the processor, cause the article to:
    receive a first plurality of documents;
    generate a first plurality of homogenous clusters using the first plurality of documents, wherein each of the first plurality of documents is included in only one of the clusters, wherein each of the clusters includes one or more of the documents and wherein the documents in each cluster share certain characteristics more closely with each other than the documents of the other clusters in the first plurality of clusters;
    for each cluster in the first plurality of clusters:
      select a single document from the cluster;
      generate a first set of tokens from only the single document selected from the cluster, wherein an order of the tokens in the single document selected from the cluster is preserved in an order of the tokens in the tokens;
      identify a second set of tokens in the tokens that occur in each of the other documents in the cluster in the preserved order;
      generate a regular expression for the cluster using the second set of tokens and the preserved order; and
    provide the regular expressions for each of the first plurality of clusters to a document classifier.

20. The article of claim 19, the instructions further causing the article to:
  attempt to classify a second plurality of documents into the first plurality of clusters using the regular expressions;
  add each those of the second plurality of documents that were successfully classified into one of the first plurality of clusters to that cluster;
  cluster those of the second plurality of documents that were not successfully classified into one of the first plurality of clusters into a second plurality of clusters;
  generate a regular expression for each of the second plurality of clusters; and
  provide the regular expression for each of the second plurality of clusters to the document classifier.

* * * * *